March 6, 1928.
H. A. ZIMMERMAN
1,661,521
HIGH PRESSURE GREASE GUN
Filed May 2, 1927
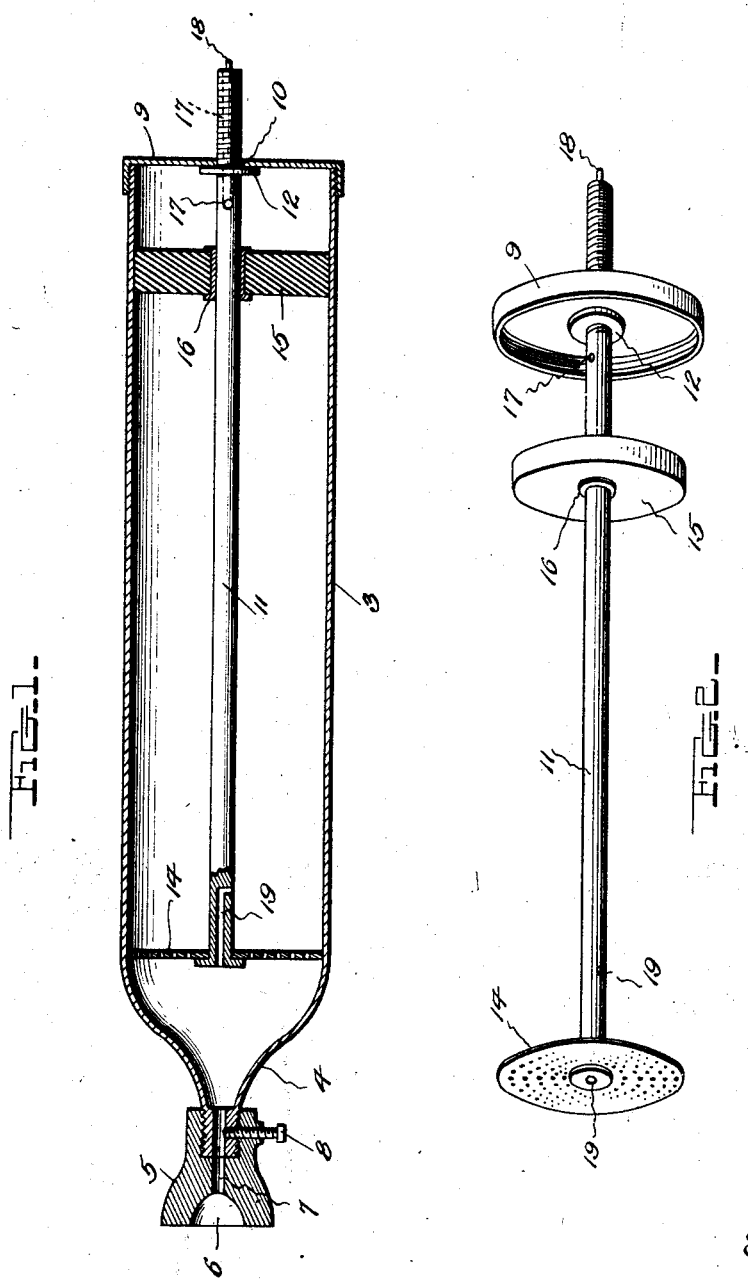
Inventor
H. A. Zimmerman Patented Mar. 6, 1928.

1,661,521

UNITED STATES PATENT OFFICE.

HENRY A. ZIMMERMAN, OF LOGANSPORT, INDIANA, ASSIGNOR OF ONE-HALF TO MERL M. WALL, OF LOGANSPORT, INDIANA.

HIGH-PRESSURE GREASE GUN.

Application filed May 2, 1927. Serial No. 188,275.

The invention relates to improvements in grease guns designed primarily for use in the lubrication of motor vehicles, although not restricted to such use.

One object of the invention is to provide an exceptionally simple and inexpensive, yet an efficient and convenient device of novel construction, which may be used in connection with an ordinary free air line at a service station or the like, taking advantage of the air pressure to eject the grease from the gun.

A further aim is to make unique provision for relieving the piston from excessive pressure when the cylinder of the grease gun has been emptied by maximum forward travel of said piston.

Yet another aim is to provide a novel discharge nozzle for the gun, which may be engaged with grease inlet nipples of different sizes.

With the foregoing in view, the invention resides in the novel subject matter hereinafter described and claimed, the description being supplemented by the accompanying drawing.

Fig. 1 is a longitudinal section partly in elevation showing a grease gun constructed in accordance with my invention.

Fig. 2 is a perspective view showing a number of the parts removed from the grease containing cylinder.

In the drawing above briefly described, the preferred form of construction has been illustrated, and while this construction will be hereinafter specifically described, it is to be understood at the outset that within the scope of the invention as claimed, variations may be made.

The numeral 3 designates an elongated metal cylinder having a contracted front end 4 upon which a grease discharge nozzle 5 is threaded, the front end of said nozzle being formed with a socket 6 which is forwardly flared so that it may be readily engaged with grease inlet nipples of different diameters. 7 denotes the grease outlet passage from the front end of the cylinder 3 into the socket 4, and at 8 a cutoff valve has been shown for said passage, it being of course understood however that I am not restricted to such details.

The rear end of the cylinder 3 is closed by a removable cap 9 having a central opening 10. The rear end portion of a rod 11 is threaded through this opening and is locked at right angles to the cap 9 by a lock nut 12. The rod 11 is disposed longitudinally within the cylinder 3 and secured upon the front end of this rod in any desired manner, is an apertured plate 14 which removably contacts with the cylinder. A piston 15, preferably formed of cork, is slidable upon the rod 11, being preferably provided with a metal bushing 16 engaging said rod. A pressure inlet port 17 is formed longitudinally through the rear portion of the rod 11 for the purpose of admitting air pressure behind the piston 15 to forwardly slide the latter, thereby ejecting grease from the nozzle 5. Preferably, a valve such as an inflation valve is provided in the port 17, the outer end of said valve being indicated at 18.

The forward movement of the piston 15 is limited by the plate 14, and to then relieve the air pressure upon the piston, I provide a port 19 in the front end of the rod 11. The front end of this port opens through the front extremity of the rod while its rear end opens through the periphery of said rod, said rear end being rearwardly spaced from the plate 14, a distance at least equal to the thickness of the piston 15. Thus, when this piston reaches the limit of its forward movement, it uncovers the rear end of the port 19 and pressure may escape from the cylinder without exerting any injurious force upon the piston, this being particularly desirable if said piston be formed of cork or analogous yieldable material. Moreover, when the escape of air takes place, the operator may hear the hissing sound and consequently knows that the barrel or cylinder 3 is empty.

To fill the cylinder with grease, the cap 9 is detached from said cylinder and is pulled outwardly to withdraw the piston 15 from the cylinder. Then, with the piston near the cap, said cap may be again moved inwardly to position the plate 14 near the front end of the cylinder. This having been done, the cap and piston may be bodily swung to one side, giving ample room between them and the cylinder wall for filling the cylinder with grease. Then, the piston is re-positioned in the cylinder and the cap 9 is re-applied, whereupon the device is in readiness for further use.

Excellent results are obtainable from the details disclosed and they may therefore be followed. As above stated, however, variations may be made within the scope of the invention as claimed.

I claim:—

1. A grease gun comprising a cylinder having a pressure inlet at its rear and a grease outlet at its front end, a rod mounted longitudinally in said cylinder and a piston slidable on said rod, the front portion of said rod having a pressure-releasing port whose front end opens through the front end of the rod and whose rear end opens through the periphery of said rod, said rear end of said port being disposed to be uncovered by the piston when the latter reaches the limit of its forward travel.

2. A grease gun comprising a cylinder having a grease outlet at its front end and an opening in its rear end, a longitudinal rod in said cylinder whose rear end passes through said opening, said rear end of said rod having a longitudinal pressure-conducting port whose inner end opens into the cylinder, and a piston slidable on said rod, the front portion of said rod being provided with a longitudinal pressure-releasing port whose front end opens through the front end of the rod, while its rear end opens through the periphery of said rod, said rear end of the pressure-releasing port being disposed to be uncovered by the piston when the latter is at the limit of its forward travel.

3. A grease gun comprising an elongated cylinder having a grease outlet at its front end and provided at its rear end with a cap having a central opening, a rod extending along the longitudinal central portion of said cylinder and passing through said opening, said rod being secured to said cap for removal bodily therewith, a piston slidable on said rod, the rear portion of the latter being formed with a longitudinal port for admitting fluid under pressure between the piston and cap, and an apertured plate secured to the front end of said rod and extending across the cylinder to limit the forward movement of the piston and to withdraw the latter from the cylinder when the rod is withdrawn, the front portion of said rod having a longitudinal port to conduct pressure from behind the piston into the part of the cylinder in front of said plate when said piston reaches the limit of its forward travel.

In testimony whereof I have hereunto affixed my signature.

HENRY A. ZIMMERMAN.